United States Patent [19]

Baroody, Jr.

[11] Patent Number: 4,703,515

[45] Date of Patent: Oct. 27, 1987

[54] IMAGE ROTATION

[75] Inventor: Anthony J. Baroody, Jr., Pittford, N.Y.

[73] Assignee: Xerox Corporation, Stamford, Conn.

[21] Appl. No.: 769,525

[22] Filed: Aug. 26, 1985

[51] Int. Cl.[4] .............................................. G06K 9/32
[52] U.S. Cl. ..................................... 382/46; 340/727; 358/140
[58] Field of Search .................... 382/44, 46; 340/727; 358/22, 140; 364/725, 731, 518

[56] References Cited

U.S. PATENT DOCUMENTS

| 3,898,627 | 8/1975  | Hooker et al. | 340/172.5 |
| 3,976,982 | 8/1976  | Eiselen       | 340/172.5 |
| 4,000,486 | 12/1976 | Schomburg     | 340/172.5 |
| 4,203,154 | 5/1980  | Lampson et al.| 364/200   |
| 4,271,476 | 6/1981  | Lotspiech     | 364/515   |
| 4,300,206 | 11/1981 | Belleson et al.| 364/900  |
| 4,545,069 | 10/1985 | Kermisch      | 382/46    |
| 4,593,407 | 6/1986  | Konishi et al.| 382/46    |

OTHER PUBLICATIONS

IBM Technical Disclosure Bulletins, vol. 17, No. 10, Mar. 1975 & vol. 18, No. 8, Jan. 1976.
IEEE Transactions on Computers, Jul. 1972, titled "A Fast Computer Method for Matrix Transposing".

Primary Examiner—David K. Moore
Assistant Examiner—Jacqueline Todd

[57] ABSTRACT

The present invention is concerned with bit map data and methods of conveying bit map data into and out of a band buffer and shift register to an image output terminal to provide either portrait or landscape printing during print time. In particular, for portrait printing; and 8 to 1 multiplexer selects one of 8 bits to send for each register scan. For landscape printing, the 8 bits are sent to a shift register and then all 8 bits are sent as part of the raster scan.

4 Claims, 10 Drawing Figures

SCANNED IMAGE STORAGE USING
THE CROSSSTRIKE FORMAT

FIG. 4

BAND BUFFER: n X 8 MEMORY

| SCAN LINE # 1 |
|---|
| SCAN LINE # 2 |
| SCAN LINE # 3 |
| SCAN LINE # 4 |
| SCAN LINE # 5 |
| SCAN LINE # 6 |
| SCAN LINE # 7 |
| SCAN LINE # 8 |

FIG. 5

BAND BUFFER: n X 8 MEMORY

| SCAN LINE #1 | SCAN LINE #2 | SCAN LINE #3 | SCAN LINE #4 | SCAN LINE #5 | SCAN LINE #6 | SCAN LINE #7 | SCAN LINE #8 |
|---|---|---|---|---|---|---|---|

BASE = ((Y-LOCATION MOD 8)-1)*n/8

OFFSET = X-LOCATION / 8

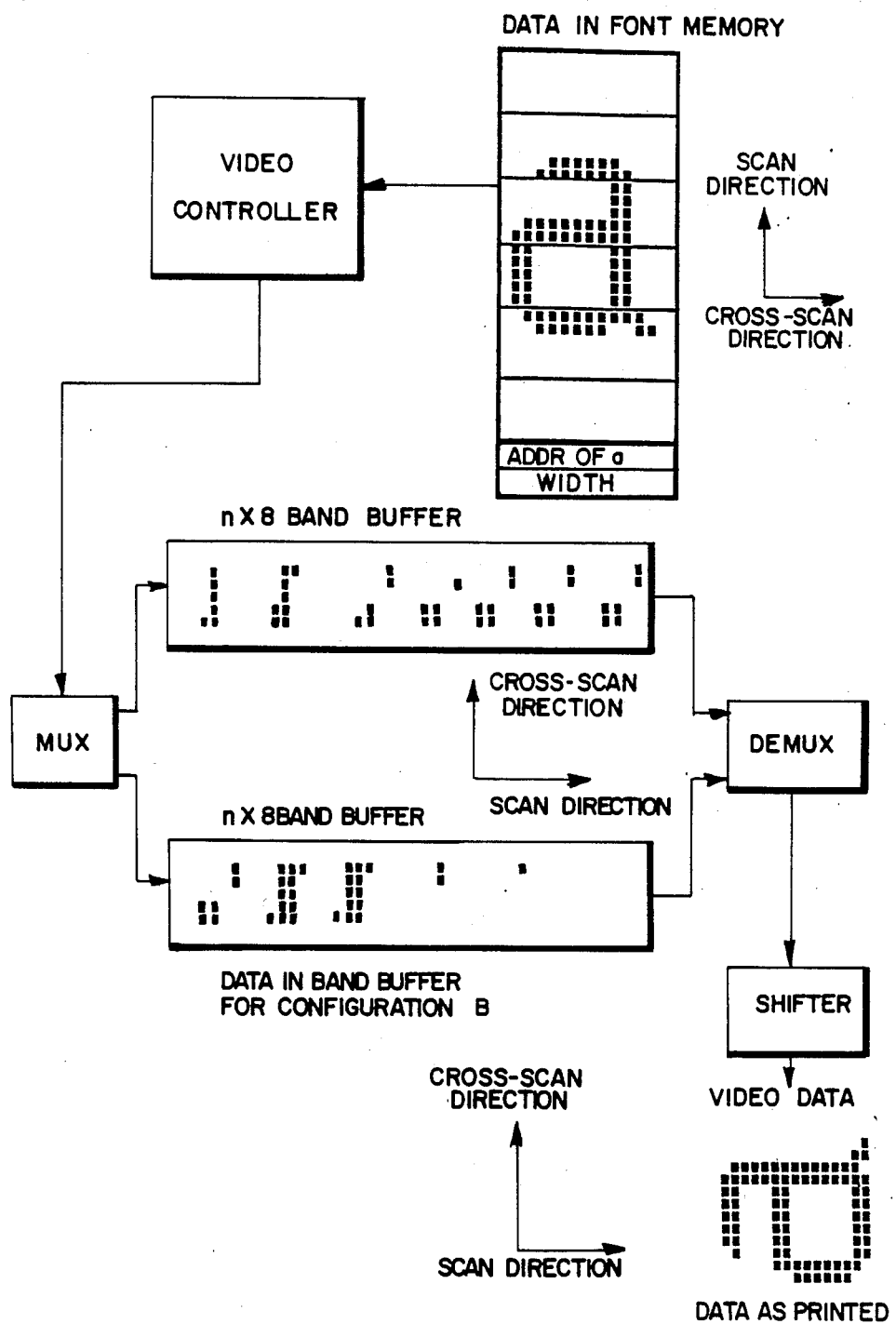

IMAGE ROTATION

BACKGROUND OF THE INVENTION

This invention relates to the processing and printing of images represented by coded or non-coded digital information in the form of lines of raster bits arranged in a given scan format, and in particular to the rotation of such images.

The prior art is replete with techniques for image rotation. For example, IBM Technical Disclosure Bulletins Vol. 17, No. 10, March 1975, and Vol. 18, No. 8, January 1976 disclose shift registers for image orientation. Other systems such as shown in U.S. Pat. No. 4,000,486 describe a page memory access control having a plurality of registers associated with rows on a page to be printed. U.S. Pat. No. 4,271,476 shows a method for rotating images having a horizontal scan format into a vertical scan format. The digital image is divided into a plurality of sections, the scan direction of each section is rotated in sequence, and then the rotated sections are combined. See also U.S. Pat. Nos. 3,976,982 and 4,300,206.

Another method of rotation is shown in an article in IEEE Transactions on Computers, July 1972, titled "A Fast Computer Method for Matrix Transposing". In particular, the article teaches a mathematical theory for rotation of matrices. In other methods, for example, U.S. Ser. No. 547,199, filed Oct. 31, 1983, there is shown a method of rotating digital images by dividing the image into horizontal regions of equal size that can be manipulated in computer memory. Each region is rotated separately and a scratch file is produced containing the rotated regions in sequence. In a series of steps, the rotated regions are progressively doubled in size until one region includes the entire rotated image.

Raster printing systems usually store character representations as a matrix of bits. The matrix, or bitmap, is merged into the data stream being transmitted to the output device. If the printer is required to print in both landscape and portrait mode, then separate bitmaps are used for each rotation of the image or font, as disclosed in U.S. Pat. Nos. 4,000,486 and 3,898,627.

Rather than implement a buffer large enough to store the entire raster image, a frequently-used buffering technique in raster printing systems is generation of the image incrementally in small groups of scan lines called bands, as disclosed in U.S. Pat. No. 4,203,154. The bands are assumed to have fixed length and width so that each band of image data occurs at a fixed place within the image. A double buffering approach allows a band to be generated and stored in a small band buffer while the previous band is transmitted to the printer.

There are five major components to a system using this band buffer approach for character printing: the Band Buffers, an Image/Font Memory holding scanned images and character bitmaps for each font, a Video Controller which retrieves data from the Image/Font memory and loads the band buffers with video data, a Print Controller which interprets character requests and generates commands for the Video Controller and an Output Controller which extracts video data from the band buffers after they are filled by the Video Controller and presents the video data to the image output terminal in scan line form.

Portrait printing is defined to be raster scanning of a page if the raster scans go down with the lines of the page. For example, a typewriter is a portrait raster scan device. The carriage scans horizontally and the text is read horizontally. On the other hand, a landscape printing the page is scanned horizontally but the text is read by turning the page 90 degrees. Two additional orientations are sometimes also used: inverse portrait in which the original portrait image is rotated 180 degrees and inverse landscape in which the original landscape image is rotated 180 degrees.

A difficulty in the prior art is to be able to generate any of these four orientations during print time. In other words, in the prior art if the image is stored in a portrait mode, the image must be rotated and restored before printing in the landscape mode. This requires more space and more time. It would be desirable therefore to be able to print in a given mode without the necessity of re-orienting the image in memory.

It is an object of the present invention, therefore, to provide an improved image rotation system. It is another object of the present invention to provide a system that is capable of rotating images during real time generation of the video data for printing without first re-orienting and storing the rotated image prior to printing. It is still another object of the present invention to augment the word-addressable band buffers to enable character bitmaps in a single rotation to be used to perform image generation for portrait, landscape, inverse portrait and inverse landscape modes.

Further advantages of the present invention will become apparent as the following description proceeds, and the features characterizing the invention will be pointed out in the claims annexed to and forming a part of this specification.

Briefly, the present invention is concerned with bitmap data and methods of conveying bit map data into and out of a band buffer and shift register or multiplexor to an image output terminal to provide either portrait or landscape printing during print time. That is, the five components used in band buffer printing are extended to meet image rotation objectives. First, a word-addressable Image/Font CrossStrike Memory format is used to store scanned images and character bitmaps. Second, word-addressable Band Buffers are used to provide video buffering which using a format which corresponds to the CrossStrike format. Then the Band Buffers are extended to also hold video data in a Folded Configuration. The Video Controller is enhanced to transfer and scatter whites so that the Video Controller is capable of producing video data in the Band Buffers in both the Standard CrossStrike Configuration and the Folded Configuration. Finally, the Output Controller is enhanced to complete the remaining video data re-orienting required to perform rotation.

For a better understanding of the present invention reference may be had to the accompanying drawings wherein the same reference numerals have been applied to like parts and wherein:

FIG. 4 illustrates a scan line buffer configuration running the length of the memory;

FIG. 5 illustrates a scan line buffer configuration with the scan lines running across the width of the band buffer;

FIGS. 9 and 10 illustrate additional circuitry to perform memory writes into the band buffers and to rotate the image during video generation in accordance with the present invention.

Figure 1:
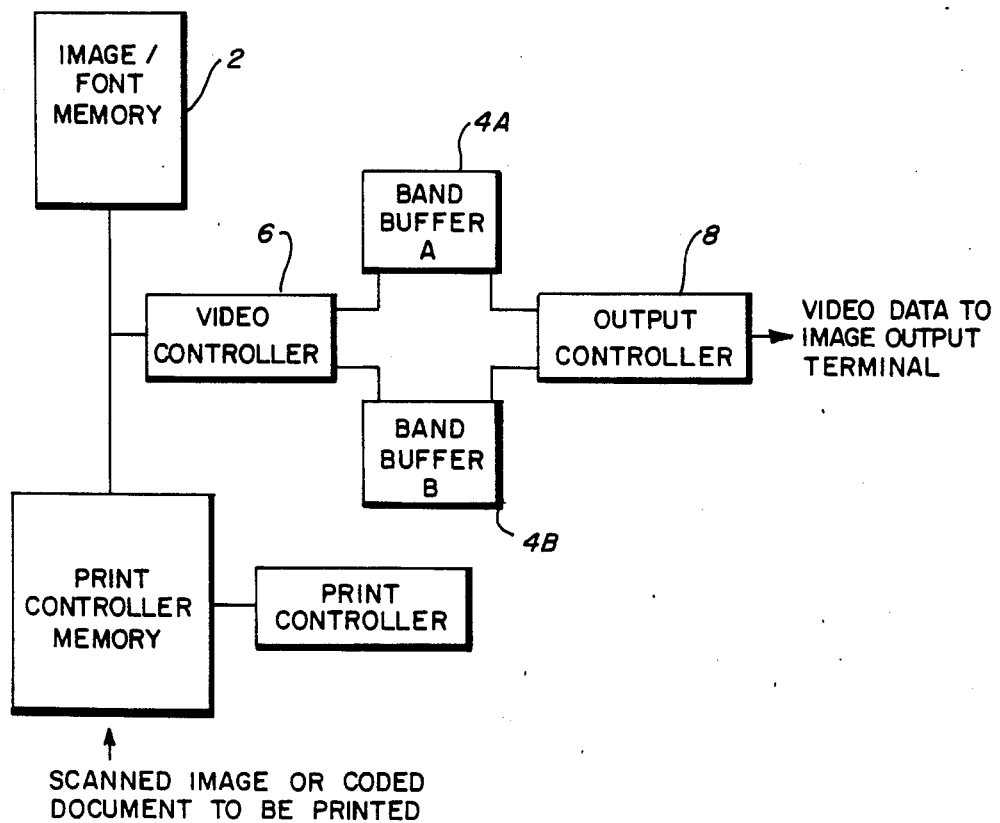
FIG. 1 illustrates the basic components of a band buffer printing system.

With reference to FIG. 1, a word-addressable Image Font Memory 2 in CrossStrike Memory format is used to store scanned images and character bitmaps. Word-addressable Band Buffers 4A and 4B are used to provide video buffering which used a format which corresponds to the CrossSTrike format. The Band Buffers 4A and 4B are extended to hold video data in a Folded Configuration. The Video Controller 6 is enhanced to transfer data from Image/Font Memory 2 to the Band Buffers 4A and 4B using both block transfers and scatter writes so that the Video controller 6 is capable of producing video data in the Band Buffers in both the Standard CrossStrike Configuration and the Folded Configuration. The Output Controller 8 is enhanced to complete the remaining video data reorienting required to perform rotation.

Figure 2:
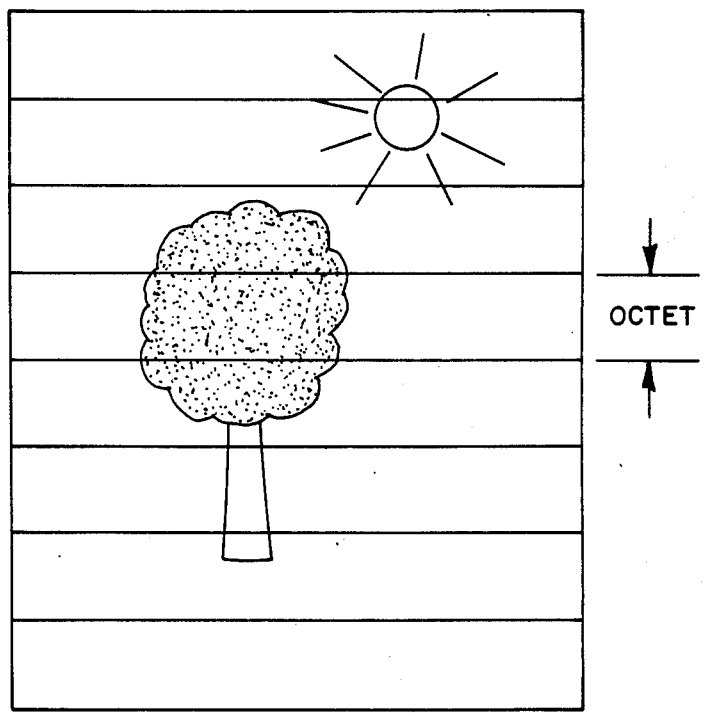
FIG. 2 illustrates a scanned imaged image storage using the CrossStrike format.

A fundamental assumption for this invention is that the Image/Font Memory is word-addressable. The actual word size is not critical; a word size of 8 is assumed for this specification. Based on this assumption, a CrossStrike image format is shown in FIG. 2. In a CrossStrike image, the bitmap matrix is organized into slices whose width equals the memory word width. For the N×8 memory assumed in this specification, the width of each slice is 8 scan lines. The data for each slide is stored in octets, or bytes of data. Each octet contains a single bit from 8 scan lines, with N bytes used to store 8 scan lines of length N. Memory is allocated sequentially for each octet, the octets for the first slice, followed by the octets for the second slice, etc.

The font format is derived from this image format. In a CrossStrike font, individual rasters are assembled in alphabetical order into a single large raster called a strike. The bounding box of each character, i.e. the white space around each character, is explicitly stored in Image/Font Memory. The baselines of the characters are aligned by aligning the bounding boxes, and the origin of each character is coincident with the width vector of the preceding character.

Figure 3:
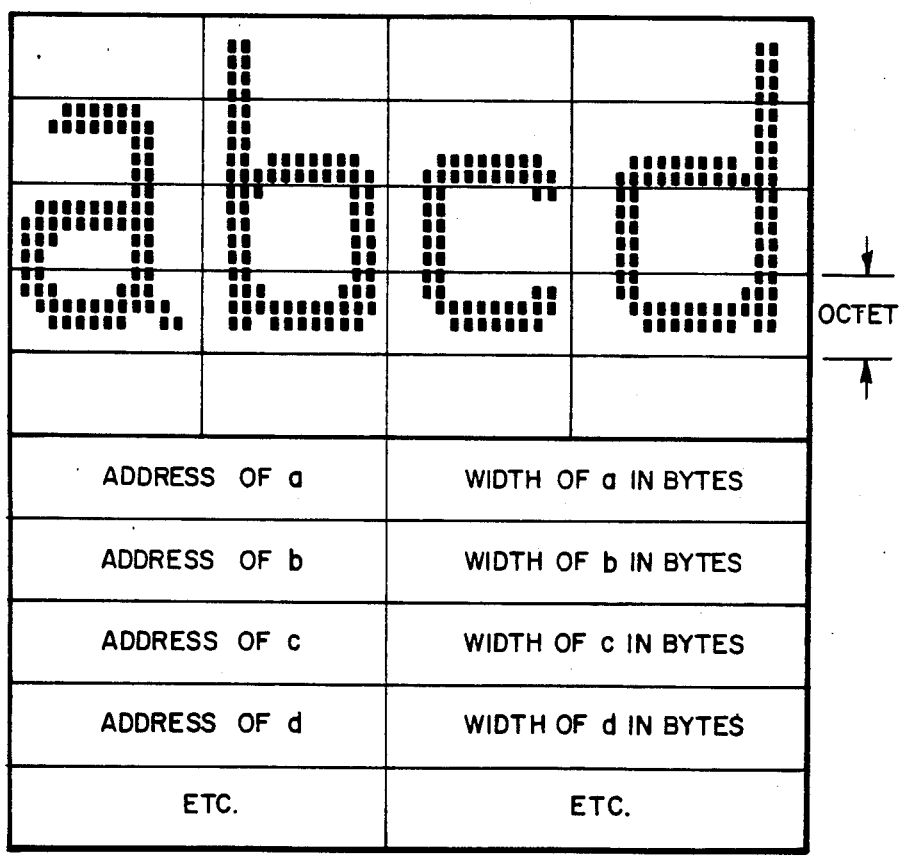
FIG. 3 illustrates a CrossStrike font format.

The memory for a CrossStrike font is also organized into octets, or bytes of data (See FIG. 3). Memory is allocated sequentially for each character and characters are stored sequentially, the octets for the first slice, followed by the octets for the second slice, etc. followed by the data for the next character. The font also contains a table indexed by character code which contains the starting location of each character in the strike and its width in pixels.

The next major assumption is that the band buffers are also word-addressable (N×W) memories with the same word size, W, as the Image/Font Memory. In addition, the length of the memory, N, is the same as the scan line length of the output device in bits. The remainder of this description assumes the band buffers are N×8 memories.

Scan lines of video data can be mapped onto this memory in two ways: The Standard Configuration and the Folded Configuration. In the first method, the Standard Configuration, which is identical to a slice of Image/Font data in the CrossStrike format, is shown in FIG. 4. Scan lines run the length of the memory. Consequently each byte of memory contains a single bit of eight different scan lines. To access a single scan line for presentation to the image output terminal requires that all N bytes of the memory be accessed. Because each byte of the memory is read once for each bit of a scan line the memory cycle time to the band buffer must be eight times faster than the video data rate of the image output terminal.

To output video data from the band buffer, the Output Controller implements the following algorithm:

Standard Output Algorithm

```
FOR i IN [1...8] DO
FOR j IN [1...n] DO
Read byte at location j
Select ith bit from this byte
ENDLOOP
ENDLOOP
```

In the second method, the Folded Configuration as shown in FIG. 5, scan lines are "folded" into the memory and run across the band buffer. Each byte of the band buffer contains eight bits of a single scan line. To output a single scan line, n/8 bytes of the band buffer are read. Within the N×8 memory, the first N/8 bytes contain the first scan line, the second N/8 bytes contain the second scan line, etc. To output video data in this configuration, the output controller implements the following algorithm:

Folded Output Algorithm

```
FOR i IN [1...n] DO
Read byte at location i
FOR j IN [1...8] DO
Shift byte to obtain jth data bit
ENDLOOP
ENDLOOP
```

In current practice only one band buffer configuration is implemented and images and fonts must be stored in a format which matches the configuration. Images not matching this format must be re-oriented and stored prior to printing; bitmaps for characters in each orientation are generated, converted into a format compatible with the band buffer and stored in the Image/Font Memory. Multiple bitmaps are used so that the video controller can perform block moves of image or font data from the Image/Font memory to the band buffers. In a block move the address of successive words to transfer is generated by incrementing the location of the word currently being transferred. The Output Controller implements only one of the two methods described above, with the choice corresponding to the configuration of the Band Buffers.

Figure 6:
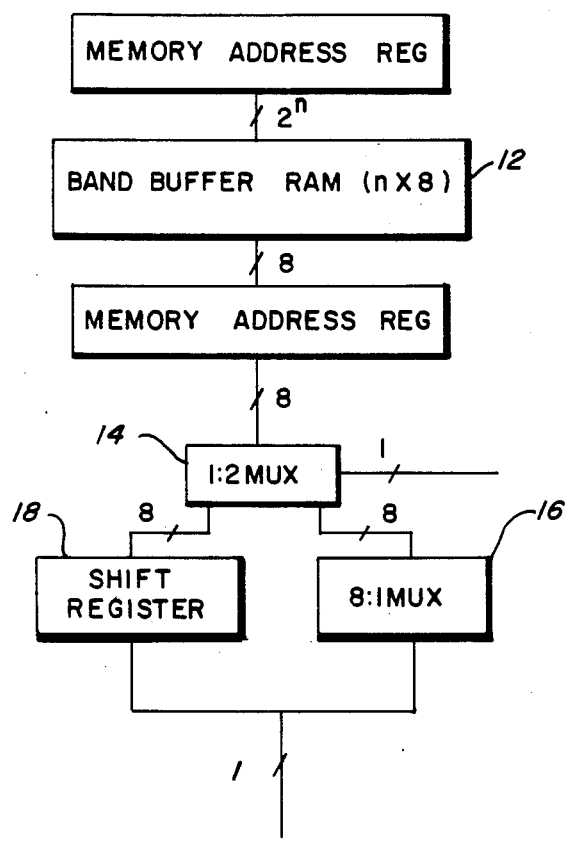
FIG. 6 is a circuit for combining the band buffer configurations of FIG. 4 and FIG. 5 in accordance with the present invention.

In the present invention, the Video Controller is enhanced in to implement both The Standard Configuration and the Folded Configuration of the Band Buffers and to select the appropriate configuration for each page to be printed. In addition, the Output Controller is also enhanced to support both configurations. The Output Controller logic to support both band buffer configurations is contained within a single circuit (See FIG. 6) with the configuration of the band buffer memory as an input selected for each page. The video data is extracted from the bytes read from the band buffer 12 with a demultiplexor 14 which routes the data for The Standard Configuration to an 8:1 multiplexor 16 which selects the appropriate data bit and for The Folded Configuration to a shift register 18 which serially outputs all eight data bits.

A separate shift register is not actually required. The Output Control algorithm can be modified slightly from the Folded Configuration shown earlier to use the 8 to 1 multiplexor to achieve the same effect as adding the shift register:

Folded Output Algorithm

```
FOR i IN [1...n] DO
  Read byte at location i
  FOR j IN [1...8] DO
    Select jth bit from this byte using 8:1 Multiplexor
  ENDLOOP
ENDLOOP
```

To print Landscape mode an image or font captured originally in Portrait mode a rotation is required which involves substantial reorganization of the image date. In this invention, part of this reorganization is performed by the Video Controller as it places video data into the Band Buffers 4A and 4B. The remainder is performed by the Output Controller 8 as it outputs data from the Band Buffer to the image output terminal.

In the current art, block transfers are used by the Video Controller to move image or font data into band buffers. This invention enhances the Video Controller as follows. Image or font data is read from Image/Font memory 12 using block reads. However, based on the data re-orientation required to support the specified printing orientation, either "scatter" writes or block writes are used as the data is transferred into the Band Buffers 4A and 4B. In a scatter write, the address of successive words which are transferred is a function which depends on the current Image/Font memory location, the configuration of the band buffer and the size of the image or character bitmap being transferred.

The result is that when block transfers are used into the Band Buffers the video data is stored in the Standard Configuration. When scatter writes are used, the data taken from the Image/Font Memory 2 is re-oriented into the Folded Configuration. The remainder of the reorganization required for rotation is performed using the Folded Output algorithm in the Output Controller 8.

A detailed implementation of the Video Controller algorithm for these transfers is given below with the following simplifying restrictions. The fonts are restricted to the size range of eight to twelve points. All fonts in this range are allocated bitmaps with the same height. Assuming a resolution of 300 spi, characters are divided into six octet slices. This enables the counters used in the implementation to have a fixed range (the height could be stored as a parameter in the font index and thereby eliminate this restriction).

Figure 7:
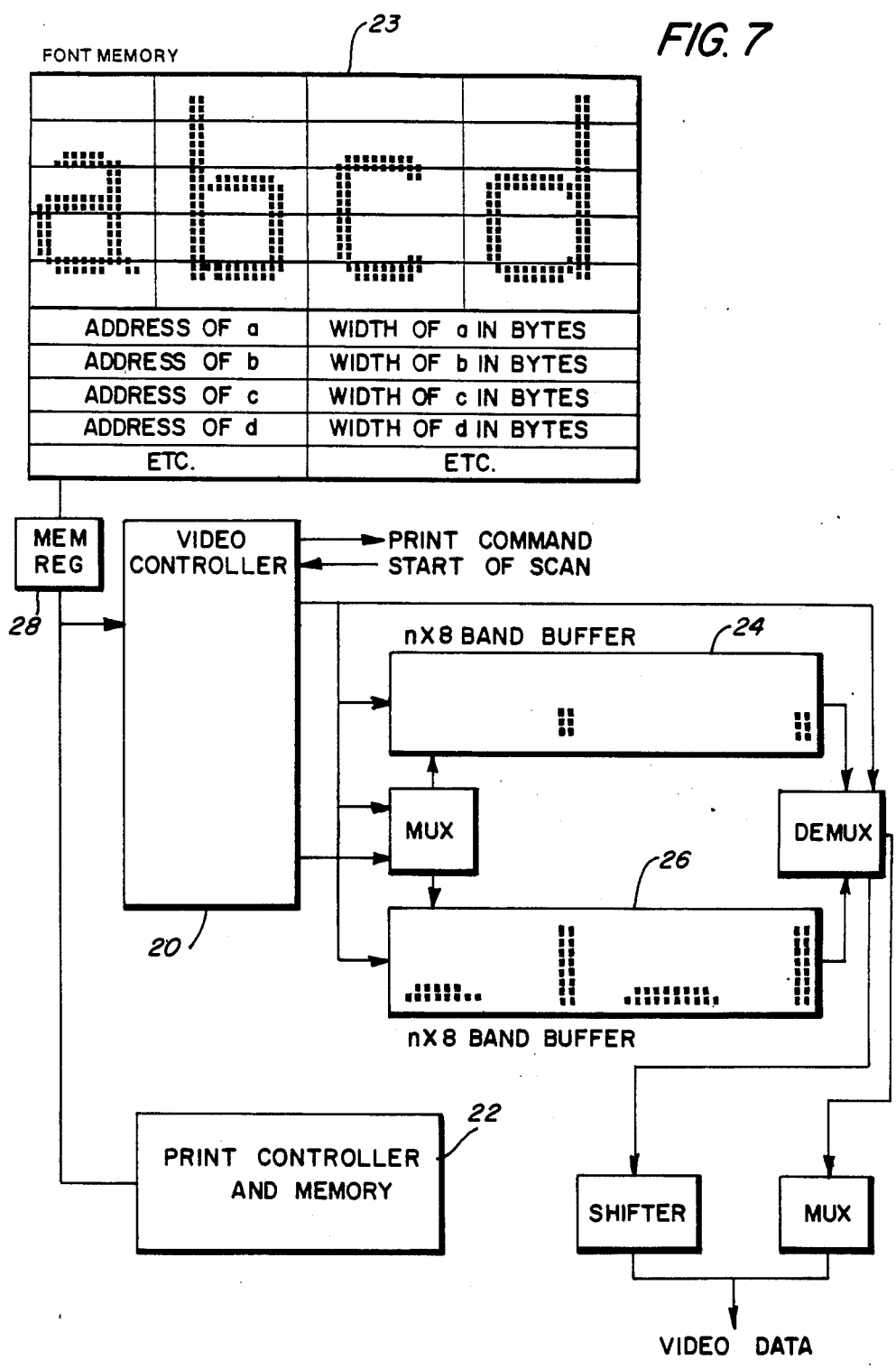
FIG. 7 illustrates a system for multi-font character and image generation in accordance with the present invention.

Several implementations are possible. The implementation can be hardwired using combinational logic or programmed logic can be implemented in firmware for a device such as the INTEL 8089 processor or the AMD 29116 programmable controller. With reference to FIG. 7, there is an illustration of the application of the present invention to a printer.

The Video Controller 20 contains the following registers which also may be accessed by the print controller 22 (a short-edge feed printer is assumed):

numBytes: a counter which controls the number of data transfers mode: a two-bit register indicating portrait, landscape, inverse portrait or inverse landscape mode x-location: horizontal character position in bits y-location: vertical character position in scan lines width: character width in pixels start-addr: starting location in image/font memory for current transfer data-reg: temporary data register locn-reg: temporary address register shiftCnt: offset for data positioning within band buffer MSB: upper 8 bits of shifted data LSB: lower 8 bits of shifted data In addition, the Image/Font memory 23 and the band buffer memories 24 and 26 are each assumed to have a single memory address register and single memory data register.

imageFontMemoryAddr: Image/Font Memory address register imageFontMemoryData: Image/Font Memory data register bandBufferMemoryAddr: Band Buffer Memory address register bandBufferMemoryData: Band Buffer Memory data register The print controller sets the mode register 28 to specify portrait, landscape, inverse portrait or inverse landscape mode. For portrait mode the Standard Configuration is used and each character is transferred by the Video Controller 20 from the Image/Font memory 23 to the band buffer with block transfers. The print controller 22 maintains status information on the number of slices which have been transferred for each character. The print controller extracts the starting addresses and the width from the font index. For the first character slice, these values are stored directly into the start-addr and width registers; for subsequent slices the value stored in the start-addr register is computed from the starting address, the width, and the number of slices already transferred.

The x and y location of the character map directly into positions within the Band Buffer. The y location of the character determines which band of image data in which it will first appear and its scan line position within the band (the y location modulus the band buffer width of 8 scan lines). The x location is the starting byte within the band buffer for the block transfer. The print controller also maintains information on the portion of the character, if any, which crosses the band boundary as a result of the shift operation.

The Video Controller then performs the transfer by implementing the following algorithm for each scanned image or character slice:

```
locn-reg ← startaddr
/*location of first Image/Font data to transfer*/
FOR i IN [1...numBytes]DO
/*numBytes is either the image or character width*/
  fontMemoryAddrReg ← locn-reg
  data-reg ← fontMemoryDataReg
```

-continued
```
    bandBufferMemoryAddrReg ← x-location
    shiftCnt ← y-location MOD 8
    data-reg ← data-reg RIGHTSHIFT shiftCnt
    bandBufferMemoryDataReg ← data-reg OR
    bandBufferMemoryDataReg
    locn-reg ← locn-reg + 1
    x-location ← x-location + 1
    ENDLOOP
```

For landscape mode using the Folded Configuration the computation of band buffer addresses is more complex. Also, maintenance of information on the number of bytes moved during a video controller transfer is more complicated. For portrait mode, the width of each CrossStrike slice corresponds to the number of bits within a scan line in the image or character. However, in Landscape mode, the image or character is to be rotated so the scan length becomes the number of scan lines. In a similar manner, the number of original scan lines become the number of bits within a scan line.

Figure 8:
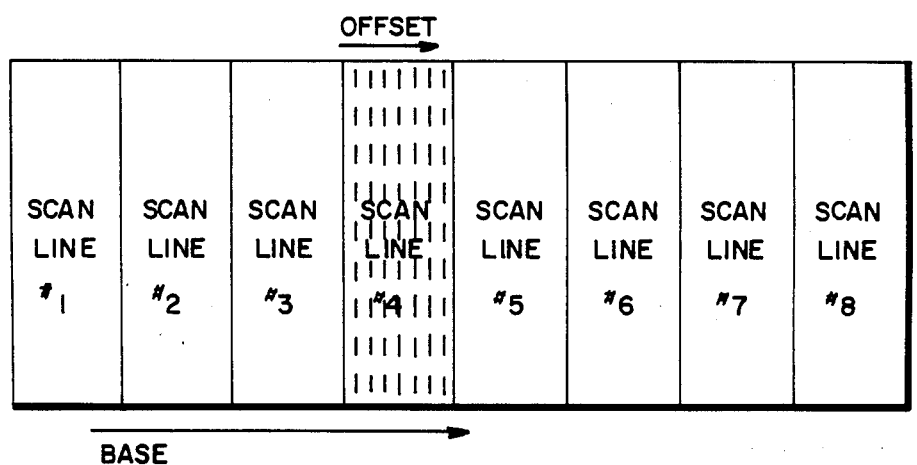
FIG. 8 illustrates a scan line buffer address calculation for the configuration of FIG. 5.

Adjacent bytes in Image/Font Memory will appear on different scan lines when printed. A scatter write is used to read bytes sequentially from the Imatge/Font memory and spread them out to separate scan lines in the band buffer. The Video Controller uses the scan line length and number of scan lines to compute memory addresses in the Band Buffer. The x location of a character is its position within a scan line; the y location is the scan line in which it first appears. In the Folded Configuration the first scan line is packed into the first N/8 bytes of the band buffer, etc. The address of a byte in the band buffer is composed of two components as shown in FIG. 8. The scan line within the buffer determines a base value and the x location determines an offset with respect to that base. A character's x location also selects a bit position within location within the byte.

The print controller maintains information on the portion of each character which are transferred in a band. This information is used to compute new parameter for data transfers in subsequent bands.

The Video Controller implementation is as follows:

```
Block read from Image/Font memory
and scatter write in band buffer:
read data from each slice for all scan lines
FOR j = 1 to numBytes DO
/*numBytes specifies the number of slices*/
save ← start-locn
FOR i = (y-location MOD 8) to 8 DO
/*extract one byte per scan line*/
imageFontMemoryAddr ← start-locn
DataReg ← imageFontMemoryData
shiftCnt ← x-location MOD 8
(MSB,LSB) ← DataReg RIGHTSHIFT shiftCnt
bandBufferMemoryAddrReg ← ((i-1)*(n/8)) + (x-location/8)
/*base value is scan line #*n/8*/
/*offset is x-location/8*/
/*need to use integer divides*/
bandBufferMemoryDataReg ← MSB OR
bandBufferMemoryData
bandBufferAddrReg ← BandBufferAddrReg + 1
bandBufferMemoryDataReg ← LSB OR
bandBufferMemoryData
/*move to next octet in image/font memory*/
start-locn ← start-locn + 1
ENDLOOP
start-locn ← save + width
ENDLOOP
```

Figure 9:
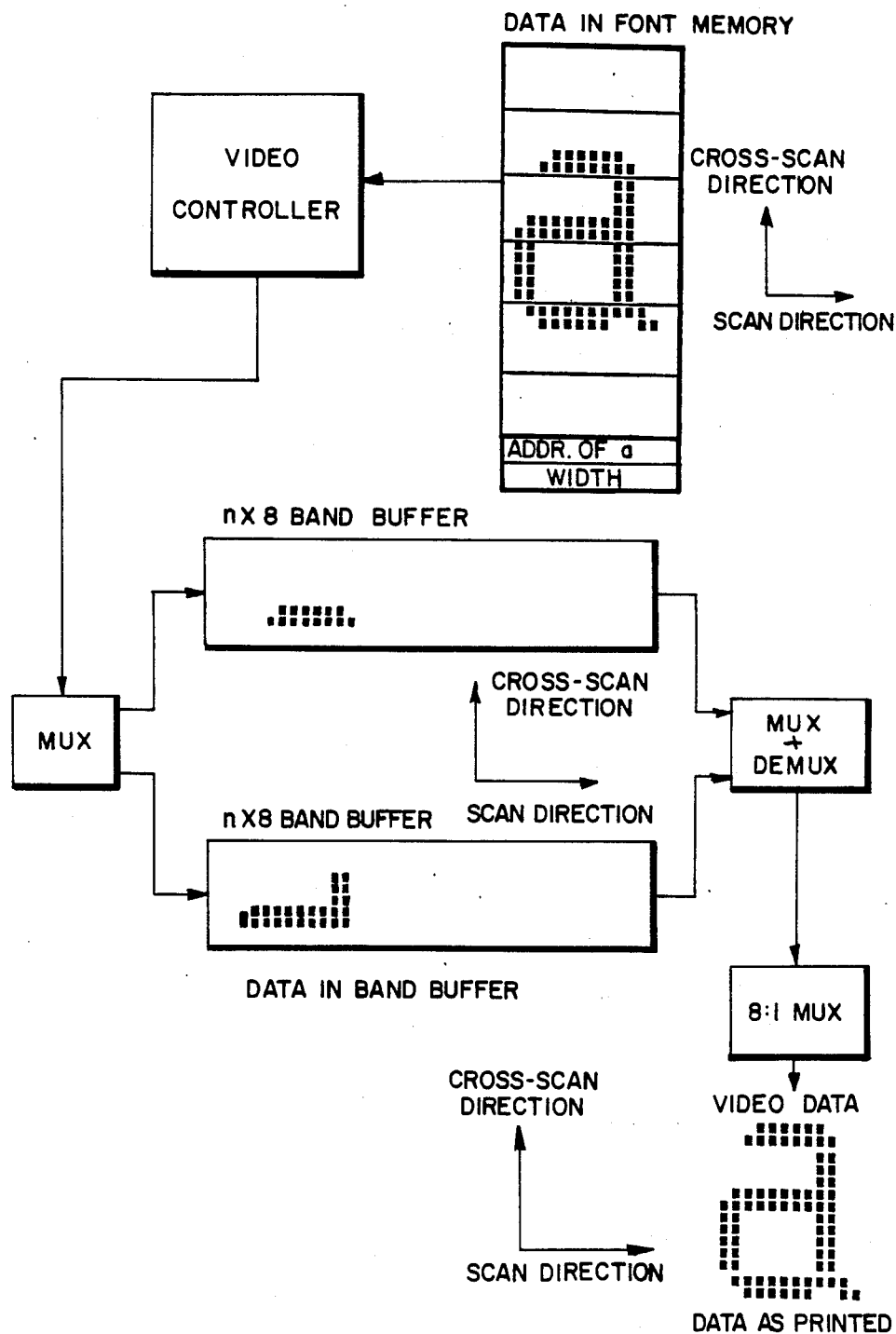

A moderate increase in the complexity of the output circuitry has enabled a single font to be used for printing in both landscape and portrait mode. Table 1 summarizes how the circuitry is programmed to accomplish printing in portrait, landscape, inverted portrait and inverted landscape orientation. FIG. 9 and FIG. 10 demonstrate how the circuitry is used to perform the necessary memory writes into the band buffers and to rotate the image during video generation for portrait and landscape modes. Printing in inverse portrait and inverse landscape are performed in a similar manner. The required operations are performed on the data written to and read from the band buffer; thus separate pre-rotate image and font bitmaps are not required.

The actual mapping of scan lines by the Video Controller for images or fonts stored in the CrossStrike format depends on the orientation of the printer and the orientation of the page being printed. The description assumes a short-edge feed printer, in which The Standard Configuration corresponds to Portrait Mode. It should be understood that this invention also contemplates a long-edge printer. For the short-edge case, the y coordinate is defined as the vertical coordinate and increases downward. For the short-edge feeder printer the y coordinate specifies a scan line number. The x coordinate increases from left to right and defines a bit position within a scan line.

As shown in FIG. 9, for portait mode printing, The Standard Configuration is selected: the scan direction is horizontal and the cross-scan direction is vertical. Thus each octet contains a single bit of eight scan lines. block moves are used to transfer an entire octet slice from the Image/Font memory into the band buffer. The video controller is given a starting address for the transfer into Image/Font memory, the number of bytes to transfer, and the starting address to store data in the band buffer. As each successive byte of the font is extracted from Image/Font memory it is stored in successive locations in the band buffer. To print a line of text, block moves are repeated for each slice of each character.

Assuming M bands are required to print the entire page, printing a portrait image is accomplished by specifying the Video Controller to use block transfers and the Output Controller to use the Standard Output Algorithm. The following steps accomplish print:

Portrait Printing

STEP 1. Generation of Video Controller Commands for the page by the Print Controller.

STEP 2. Print Controller retrieves the first slice of image or font data from the Image/Font memory and stores it as Band #1 in a Band Buffer using block transfers.

STEP 3. Using double buffering, the Print Controller retrieves the second slice of image of font data from the Image/Font memory and stores it as Band #2 in the alternate Band Buffer using block transfers while the Output Controller outputs Band #1 to the Image Output Terminal using the Standard Output Algorithm.

STEP 4. Using double buffering, the Print Controller retrieves the third slice of image or font data from the Image/Font memory and stores it as Band #3 in the alternate Band Buffer using block transfer while the Output Controller outputs Band #2 to the Image Outut Terminal using the Standard Output Algorithm.

. . .

STEP M+1. Using double buffering, the Print Controller retrieves the final slice or image or font data from the Image/Font memory and stores it as Band #M in the alternate Band Buffer using block transfers while the Output Controller outputs Band #M−1 to the Image Output Terminal using the Standard Output Algorithm.

STEP M+2. The Output Controller outputs Band #M to the Image Output Terminal using the Standard Output Algorithm.

Printing Reverse Portrait mode requires a 180 degree rotation of a Portrait image. To accomplish this rotation, the Rotated Standard Output algorithm is defined which reverses the order in which the bits of each byte are selected and the order in which addresses are generated for reading bytes of data from thd band buffer. The effect of this algorithm is to rotate the data within the Band Buffer 180 degrees. This Output Controller will present the data at the 8th bit position within the Band Buffer as the first scan line to the Image Output Terminal and to utilize the byte at location N in the Band Buffer to present the first bit of each scanline to the Image Output Terminal, the byte at location N−1 in the Band Buffer to present the second bit of each scan line, etc. To accomplish 180 degree rotation of the entire page, the image is extracted from memory in reverse order, i.e. the last slice is output as the first band, etc.

Rotated Standard Output

---
FOR i IN [8...1] DO
FOR j IN [n...1] DO
Read byte at location j
Select ith bit from this byte
ENDLOOP
ENDLOOP
---

In addition, the Video Controller must process the slices of the image in reverse order:

Inverse Portrait Printing

STEP 1. Generation of Video Controller Commands for the page by the Print Controller.

STEP 2. Print Controller retrieves the final image or font data from the Image/Font memory and stores it as Band #1 in a Band Buffer using block transfers.

STEP 3. Using double buffering, the Print Controller retrieves the next to last slice of image of font data from the Image/Font memory and stores it as Band #2 in the alternate Band Buffer using block transfers while the Output Controller outputs Band #1 to the Image Output Terminal using the Reverse Standard Output Algorithm.

STEP 4. Using double buffering, the Print Controller retrieves the slice M−2 of image or font data from the Image/Font memory and stores it as Band #3 in the alternate Band Buffer using block transfers while the Output Controller outputs Band #2 to the Image Output Terminal using the Reverse Standard Output Algorithm.

...

STEP M+1. Using double buffering, the Print Controller retrieves the first slice or image or font data from the Image/Font memory and stores it as Band #M in the alternate Band Buffer using block transfers while the Output Controller outputs Band #M−1 to the Image Output Terminal using the Reverse Standard Output Algorithm.

STEP M+2. The Output Controller outputs Band #M to the Image Output Terminal using the Standard Output Algorithm.

As shown in FIG. 10, landscape mode printing is accomplished using the Folded Configuration for the Band Buffers and the Folded Output Algorithm for the Video Controller. In memory the scan direction for CrossStrike format is horizontal. This invention converts this orientation in real time so that the scan direction for the input image or character bitmap becomes vertical and the cross-scan direction becomes horizontal when the video data is presented to the Image Output Terminal. Thus, each original octet containing a single bit of eight scan lines is converted into eight bits of a single scan line as presented to the image output terminal. The video controller is given a starting address in the Image/Font memory, the number of bytes to transfer and parameters for computing the starting address in the band buffer. The bitmap data can be transferred using a gather read from Image/Font memory or a scatter write into the band buffer. For a gather read the video controller transfers a scan line from the Image/Font memory by using the starting address for the first byte of the scan line. Then the width is added to this starting address to read the second byte in the scan line. This addition is repeated by reach byte in the scan line. Alternatively, the video controller performs a scatter write. Successive bytes are transferred from the Image/Font memory, but the location for storing in the band buffer is determined by repeatedly adding n/8 to the starting band buffer location (n/8 is the number of bytes separating the data at the same bit location in adjacent scan lines).

To accomplish printing of a page the Video controller is set to Scatter/Gather Mode and the Output Controller is programmed to use the Folded Output algorithm. The printing steps now become:

Landscape Printing

STEP 1. Generation of Video Controller Commands for the page by the Print Controller.

STEP 2. Print Controller retrieves the final image or font data from the Image/Font memory and stores it as Band #1 in a Band Buffer using block transfers.

STEP 3. Using double buffering, the Print Controller retrieves the next to last slice of image of font data from the Image/Font memory and stores it as Band #2 in the alternate Band Buffer using block transfers while the Output Controller outputs Band #1 to the Image Output Terminal using the Reverse Folded Output Algorithm.

STEP 4. Using double buffering, the Print Controller retrieves the slice M−2 of image or font data from the Image/Font memory and stores it as Band #3 in an alterate Band Buffer using block transfers while the Output Controller outputs Band #2 to the Image Output Terminal using the Reverse Folded Output Algorithm.

...

STEP M+1. Using double buffering, the Print Controller retrieves the first image or font data from the Image/Font memory and stores it as Band #M in the alternate Band Buffer using block transfers while the Output Controller outputs Band #M−1 to the Image Output Terminal using the Reverse Folded Output Algorithm.

STEP M+2. The Output Controller outputs Band #M to the Image Output Terminal using the Reverse Folded Output Algorithm.

To accomplish Inverse Landscape printing, the same changes applied earlier to the Standard Output algorithm to produce Inverse Standard Output Algorithm can be applied to yield the Inverse Output algorithm for Landscape printing.

Inverse Landscape printing is now accomplished through the following steps:

Inverse Landscape Printing

STEP 1. Generation of Video Controller Commands for the page by the Print Controller.

STEP 2. Print Controller retrieves the first slice of image or font data from the Image/Font memory and stores it as Band #1 in a Band Buffer using scatter writes.

STEP 3. Using double buffering, the Print Controller retrives the second slice of image of font data from the Image/Font memory and stores it as Band #2 in the alternate Band Buffer using scatter writes while the Output Controller outputs Band #1 to the Image Output Terminal using the Folded Output Algorithm.

STEP 4. Using double buffering, the Print Controller retrieves the third slice of image or font data from the Image/Font memory and stores it as Band #3 in the alternate Band Buffer using scatter writes while the Output Controller outputs Band #2 to the Image Output Terminal using the Folded Output Algorithm.

. . .

STEP M+1. Using double buffering, the Print Controller retrieves the first image or font data from the Image/Font memory and stores it as Band #M in the alternate Band Buffer using scatter writes while the Output Controller outputs Band #M−1 to the Image Output Terminal using the Folded Output Algorithm.

STEP M+2. The Output Controller outputs Band #M to the Image Output Terminal using the Standard Output Algorithm.

In summary, this invention extends the band buffering printing technology by enabling the reconfiguration of the Band Buffer Memory and selection of the Video Controller and Output Controller algorithms as a function of the desired page rotation. As shown in Table 1, this implements the capability to print in portrait, landscape, inverse portrait and inverse landscape using a single bitmap font. It additionally enables real-time rotation of images into these printing modes without the necessity to re-orient and store the image prior to printing.

A frequently used duplex printing format is head-to-toe printing in which portrait mode is used for the front of each sheet and inverse portrait mode is used for the back of each sheet. This invention directly supports this form of printing from a single font.

The techniques presented above can be extended to automatically generate bold and italic. Bitmaps for bold fonts can be constructed from the bitmaps for a regular weight by traversing the character outline and adding a single bit along it to thicken the character. Then the bits added to the character's height are removed to result in a bitmap for a bold version of the character with the same height. For the character stored in CrossStrike format an approximation of the bold character bitmap is produced by OR'ing each octet with its neighbors to the left and right. This operation can be done once to construct a new bitmap for the bold font, or it can be performed during the transfer of font data into the band buffers. Additional registers can be used in the video controller in pipeline to perform this computation:

$$\text{BandBufferData}_i \leftarrow \text{FontMemoryData}_{i-1} \text{ OR} \\ \text{FontMemoryData}_i \text{ OR FontMemoryData}_{i+1}$$

However, since complete output of a character will take place as multiple transfers by the video controller, how do the pieces of the character get stitched together on separate transfers? Since it has already been transferred, it is possible to use the data already in the band buffer for $\text{FontMemoryData}_{i-1}$ rather than have the print controller keep track of control information for this stitching operation. This means the OR'ing operation is performed directly just by "dithering" x-location. Rather than use locations $i-1$, $i$, and $i+1$, the "dither value" is simply offset by 1 and use locations $i$, $i+1$, and $i+2$. This solves stitching problems and eliminates leftovers, since the data involved in the computation is always in band buffer. This works because the bounding box of the character is stored in the font memory.

This same approach is feasable for italic. Italic bitmaps can be generated from a regular weight bitmap by extracting the octets from the font and moving them to the left or right, depending upon whether the particular octet is part of the upper or lower half of the character. This same tilt operation can be performed by modifying the x-location value for each slice of the character. Thus the addresses used for writing font data into the band buffer are dithered to perform the tilting operation during printing.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

TABLE 1

FINAL ROTATION/ORIENTATION VERSUS BAND BUFFER CONFIGURATIONS AND CONTROLLER ALGORITHMS

| INPUT Scanned Image & Font Format | OUTPUT Image Orientation at Image Output Terminal | Band Buffer Configuration | Video Controller Algorithm for Storing Into Band Buffer | Output Controller Algorithm |
|---|---|---|---|---|
| CrossStrike Portrait | Portrait | Standard | Block Transfer | Standard |
| CrossStrike Portrait | Landscape | Folded | Scatter Write | Folded |

TABLE 1-continued

FINAL ROTATION/ORIENTATION VERSUS
BAND BUFFER CONFIGURATIONS AND CONTROLLER ALGORITHMS

| INPUT Scanned Image & Font Format | OUTPUT Image Orientation at Image Output Terminal | Band Buffer Configuration | Video Controller Algorithm for Storing Into Band Buffer | Output Controller Algorithm |
| --- | --- | --- | --- | --- |
| CrossStrike Portrait | Inverse Portrait | Standard | Block Transfer | Inverse Standard |
| CrossStrike Portrait | Inverse Landscape | Folded | Scatter Write | Inverse Folded |

I claim:

1. A method of selectively rotating a digital image in a system having a memory for storing a digital image, a band buffer for storing a band of the digital image representing a given number of scan lines, a video controller for moving a band of the digital image from the memory to the band buffer, and an output controller for moving a band of the digital image from the band buffer to a raster output scanning device, including the steps of:

storing the digital image in the memory, said digital image stored divided into bands having a first image format having a first scan direction;

moving said digital image bands with said video controller from the memory to the band buffer for selective storage in either of first and second image formats, said second image format having a second scan direction, whereby the digital image band is partially rotated as it is stored in said band buffer; and moving said digital image portions stored in said band buffer in one of said first and second image formats, with said output controller from said band buffer to said raster output scanning device, and selectively rotating said image portions in said first and second image formats during movement to said raster output scanning device, whereby selective image rotation is completed.

2. The method of selective rotation of a digital image as defined in claim 1 wherein said second scan direction is 90° removed from said first scan direction.

3. A method of selectively rotating a digital image in a system having a memory for storing a digital image in standard configuration having a first scan direction, a band buffer for storing a band of the digital image in either standard or folded configuration having first or second scan directions respectively, a video controller for moving a band of the digital image from the memory to the band buffer in accordance with the configuration desired for storage, and an output controller for moving a band of the digital image from the band buffer to a raster output scanning device, including the steps of:

storing the digital image in the memory divided into bands having a standard configuration;

moving bands of said digital image from the memory to the band buffer for selective storage therein in either one of standard and folded configurations, whereby said digital image is partially selectively rotated as said digital image bands are stored in said band buffer in folded configuration;

moving said digital image bands stored in said band buffer in one of said folded and standard configurations, with said output controller from said band buffer to said raster output scanning device, and selectively rotating said image portions in said first and second image formats during movement to said raster output scanning device, whereby selective image rotation is completed.

4. The method of selectively rotating a digital image as defined in claim 3, wherein said video controller moves said digital image bands from said memory to storage in said band buffer, using block transfer for storage in standard configuration and scatter writing for storage in folded configuration.

* * * * *